No. 758,295. PATENTED APR. 26, 1904.
H. BREDA.
APPARATUS FOR SOFTENING WATER.
APPLICATION FILED JUNE 7, 1901.
NO MODEL.
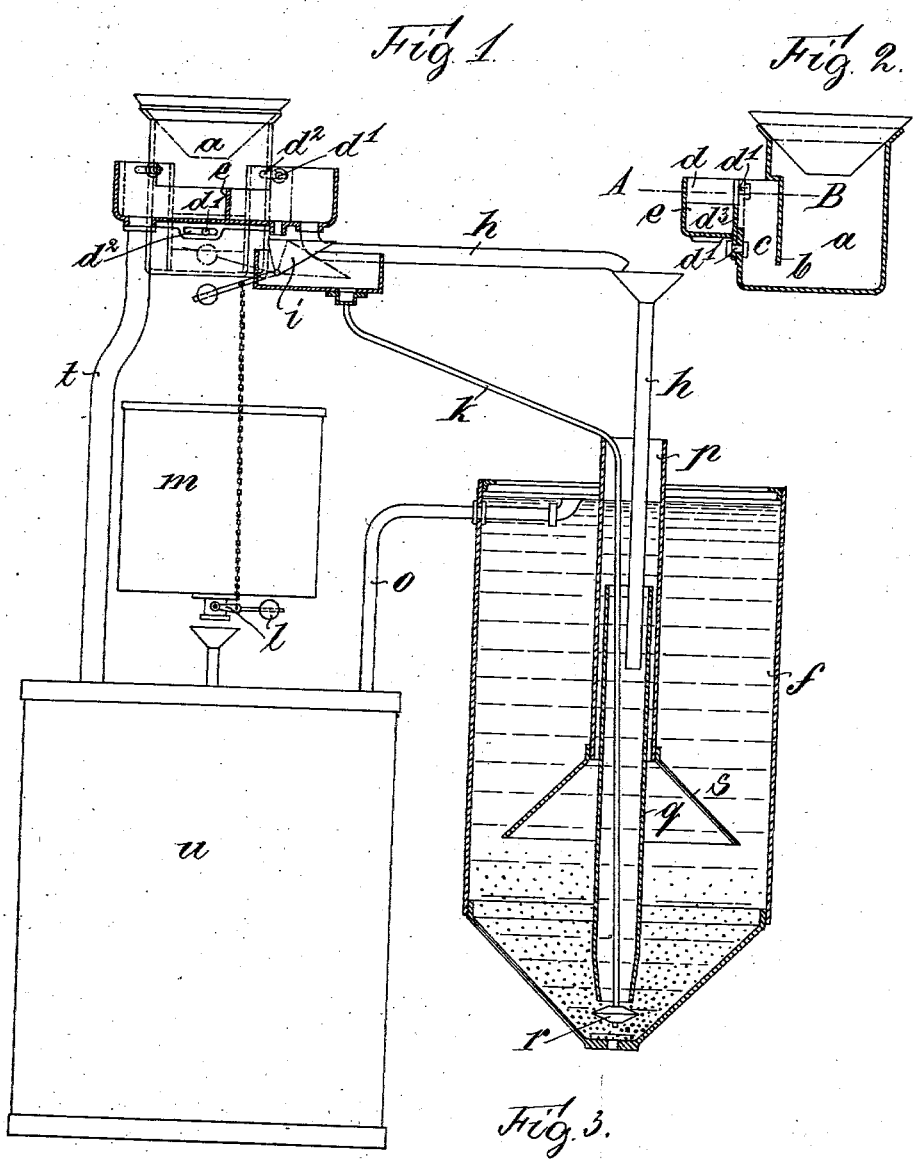
Witnesses:
Emil Kayser
Max Wescher
Inventor
Halvor Breda.
by [Attorney signature]
Attorney.

No. 758,295. Patented April 26, 1904.

UNITED STATES PATENT OFFICE.

HALVOR BREDA, OF BERLIN, GERMANY.

APPARATUS FOR SOFTENING WATER.

SPECIFICATION forming part of Letters Patent No. 758,295, dated April 26, 1904.

Application filed June 7, 1901. Serial No. 63,618. (No model.)

*To all whom it may concern:*

Be it known that I, HALVOR BREDA, engineer, a subject of the King of Prussia, German Emperor, and a resident of 38 Wilhelmstrasse, Berlin, Kingdom of Prussia, German Empire, have invented a new and useful Apparatus for Softening Water, of which the following is an exact specification.

My invention relates to a new and improved apparatus for softening boiler-water by adding small quantities of lime-water and soda to the same.

The purpose of the invention is to provide an apparatus by means of which the proportions of lime-water and soda solution added to the water are automatically regulated, so that the water treated by means of my new apparatus has always an equal softness. I attain this object by the apparatus illustrated in the accompanying drawings, in which—

Figure 1 is partly a view and partly a vertical section of the whole apparatus. Fig. 2 is a vertical section of the inlet-reservoir, and Fig. 3 is partly a plan and partly a section on line A B of the reservoir shown in Fig. 2.

In the drawings, $a$ is a reservoir into which the water to be treated is led. In the reservoir $a$ a partition $b$ is provided, around which the water flows into the channel $c$.

$d$ is a reservoir which is connected, by means of pins $d'$, sliding in slots $d^2$, to the reservoir $a$. That side wall of the reservoir $d$ which is situated toward the reservoir $a$ is provided with a recess, so as to form a weir $d^3$, over which the water from the channel $c$ flows into the reservoir $d$. The reservoir $d$ is provided with a partition $e$, which is situated so as to divide the water flowing over the weir $d^3$ in two parts, the greater part of which flows directly through the pipe $t$ into the mixing-reservoir $u$, where it is mixed with the lime and soda solutions, while the smaller water stream is led to the lime-saturater $f$. Before entering the saturater the smaller water stream is divided in two parts by means of a second partition $g$, Fig. 3. The greater part of this stream flows directly through the pipe $h$ into the lime-saturater $f$, while the smaller part flows at first into a tilting vessel $i$, by means of which arrangement it is attained that this part of the water stream flows periodically into the lime-saturater—that is to say, it flows only at that time when the tilting vessel is filled to a certain height. The water discharged from the tilting vessel flows through a pipe $k$ to the bottom of the lime-saturater $f$. This lime-saturater consists of a reservoir with cone-shaped bottom, upon which bottom the lime to be dissolved is situated. The whole reservoir is filled with water. Near the upper edge of the reservoir $f$ a pipe $o$ is provided, which leads the saturated lime-water to the mixing-reservoir $u$. In the middle of the reservoir $f$ two concentric pipes $p$ and $q$ are arranged, within which pipes the pipe for leading the continuous water stream into the lime-saturater is situated. The outer pipe $p$ reaches until over the level of the water and is provided at its lower end with a funnel $s$, situated in some distance from the bottom of the reservoir. The inner pipe $q$ reaches nearly to the bottom of the reservoir, while the upper end is situated underneath the level of the water. The pipe $k$, which serves for leading the water discharged from the tilting vessel to the bottom of the reservoir, is situated within the pipe $q$. The upper part of the pipe $k$—that is to say, the part up to the level of the water in the reservoir $f$—will after each discharge fill with air, which air by the sudden discharge of the water of the tilting vessel will be carried along with this water and pressed through the whole pipe $k$, so that it leaves this pipe at the bottom of the saturater, thereby effecting a stirring up of the lime. In order to avoid this air entering into the pipe $q$, a disk $r$ is provided, which leads the air sideward so that the same must rise outside the pipe $q$. The water leaving the pipe $k$ also rises and will partly be taken up by the funnel $s$. This water will flow into the outer pipe $p$ and through the pipe $q$ back to the bottom of the reservoir, so that a continuous circulation of part of the water arises. By this circulation a thorough solution of the lime is insured. The water above the funnel $f$ is nearly perfectly quiet and does not stream at all, so that the lime particles which are not dissolved can fall to the bottom and come in contact again with fresh water.

In order to regulate the addition of soda solution, a valve $l$ is provided at the bottom of the reservoir $m$ containing this solution, which valve is connected with the oscillating shaft of the tilting vessel $i$, so that at the same moment at which the contents of the tilting vessel is discharged the valve $l$ is opened for a moment and a small quantity of soda solution flows out of the reservoir $m$ into the mixing-reservoir $u$. In this mixing-reservoir the mixing of the clear water entering through the pipe $t$ with the soda solution flowing periodically from the reservoir $m$ into this mixing-reservoir and with the lime-water entering through the pipe $o$ takes place.

By the reservoir $d$ being connected to the reservoir $a$ by means of pins $d'$, sliding on slots $d^2$, the position of this reservoir $d$ can be changed. By changing the position of this reservoir the position of the partition $e$ will also be changed, thereby changing the proportions of the water-stream. If the reservoir $d$ is shifted to the left-hand side when considering the drawings, the quantity of water flowing through the pipe $t$ will be diminished, and consequently the quantity of lime-water will be increased. At the same time a greater quantity of water will flow into the tilting vessel $i$, and in consequence hereof the periods between the discharging of the tilting vessel will get smaller and a relative greater quantity of soda solution will flow into the mixing-reservoir. It will be understood that by this arrangement the quantity of soda solution and of lime-water added to the water to be treated can be exactly adjusted, so as to make the apparatus fit for treating any kind of water.

Having thus fully described the nature of this invention, what I desire to secure by Letters Patent of the United States is—

1. In an apparatus for softening water, the combination of an inlet-reservoir provided with an overflow-weir, with an adjustable reservoir provided with a partition situated behind said weir, a mixing-reservoir, a pipe connecting one compartment of the adjustable reservoir with this mixing-reservoir, a lime-saturater, a pipe connecting the lime-saturater with the mixing-reservoir, and a pipe connecting the other compartment of the adjustable reservoir with the lime-saturater, substantially as described and for the purpose set forth.

2. In an apparatus for softening water, the combination of an inlet-reservoir provided with an overflow-weir, an adjustable partition situated behind this weir and adapted to divide the water flowing over the same in two parts, a mixing-reservoir, means for leading one of these parts directly to the mixing-reservoir, a lime-saturater and means for leading the other part of the water through the lime-saturater into the mixing-reservoir, substantially as described and for the purpose set forth.

3. In an apparatus for softening water, the combination of an inlet-reservoir provided with an overflow-weir, an adjustable partition situated behind this weir and adapted to divide the water flowing over the same in two parts, a mixing-reservoir, means for leading one of these parts directly to the mixing-reservoir, a lime-saturater, means for dividing the other part of the water again in two parts, means for leading one of the latter parts of the water directly into the lime-saturater, a tilting vessel, means for leading the other one of the latter parts of the water into the tilting vessel, means for leading the water discharged from the tilting vessel into the lime-saturater, and means for leading the lime-water from the lime-saturater into the mixing-reservoir, substantially as described and for the purpose set forth.

4. In an apparatus for softening water, the combination of an inlet-reservoir provided with an overflow-weir, an adjustable partition situated behind this weir and adapted to divide the water flowing over the same in two parts, a mixing-reservoir, means for leading one of these parts directly to the mixing-reservoir, a lime-saturater, means for dividing the other part of the water again in two parts, means for leading one of the latter parts of the water directly into the lime-saturater, a tilting vessel, means for leading the other one of the latter parts of the water into the tilting vessel, means for leading the water discharged from the tilting vessel into the lime-saturater, means for leading the lime-water from the lime-saturater into the mixing-reservoir, a reservoir containing the soda solution, a valve connected to this reservoir, means connecting this valve with the tilting vessel and means for leading the soda solution to the mixing-reservoir, substantially as described and for the purpose set forth.

In testimony whereof I have signed my name to this specification in the presence of two subscribing witnesses.

HALVOR BREDA.

Witnesses:
  WOLDEMAR HAUPT,
  HENRY HASPER.